United States Patent

[11] 3,591,945

| [72] | Inventor | Charles Eisel |
| | | 1009 Carr St., Lakewood, Colo. 80215 |
| [21] | Appl. No. | 818,464 |
| [22] | Filed | Mar. 27, 1969 |
| [45] | Patented | July 13, 1971 |

[54] ENGINE AIR FILTER UNIT
4 Claims, 3 Drawing Figs.

[52] U.S. Cl. .................................................. 55/274, 55/510
[51] Int. Cl. ........................................B01d 46/24, B01d 46/04
[50] Field of Search............................................ 55/274, 275, DIG. 17, 276, 510; 35/51

[56] References Cited
UNITED STATES PATENTS

| 967,696 | 8/1910 | Wiedemann et al. | 55/274 X |
| 2,480,379 | 8/1949 | Newberry | 55/274 X |
| 2,871,976 | 2/1959 | Sebok | 55/276 |
| 2,894,600 | 7/1959 | Veres | 55/274 X |
| 2,943,699 | 7/1960 | Thornburgh | 55/276 |
| 3,002,870 | 10/1961 | Belgarde et al. | 55/DIG. 16 |
| 3,237,510 | 3/1966 | Boyce et al. | 55/274 |
| 3,355,863 | 12/1967 | Pittsley | 55/510 X |

FOREIGN PATENTS

| 1,147,736 | 11/1957 | France | 55/510 |

Primary Examiner—Tim R. Miles
Attorney—C. B. Messenger

ABSTRACT: A transparent component or cover for the air intake filters of internal combustion engines positioned to reveal working parts and operation of carburetors, etc. Inspection and servicing or replacement of the filter element and/or carburetor components is facilitated by configurations in which the transparent component is removable from the filter unit body. Seals are provided between the transparent component, the filter element and filter unit body for efficient useage.

PATENTED JUL 13 1971
3,591,945
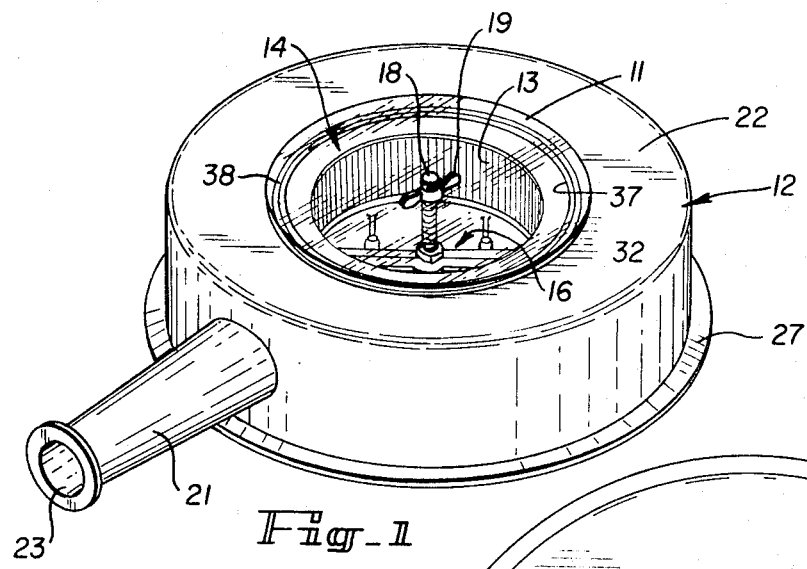
Fig_1
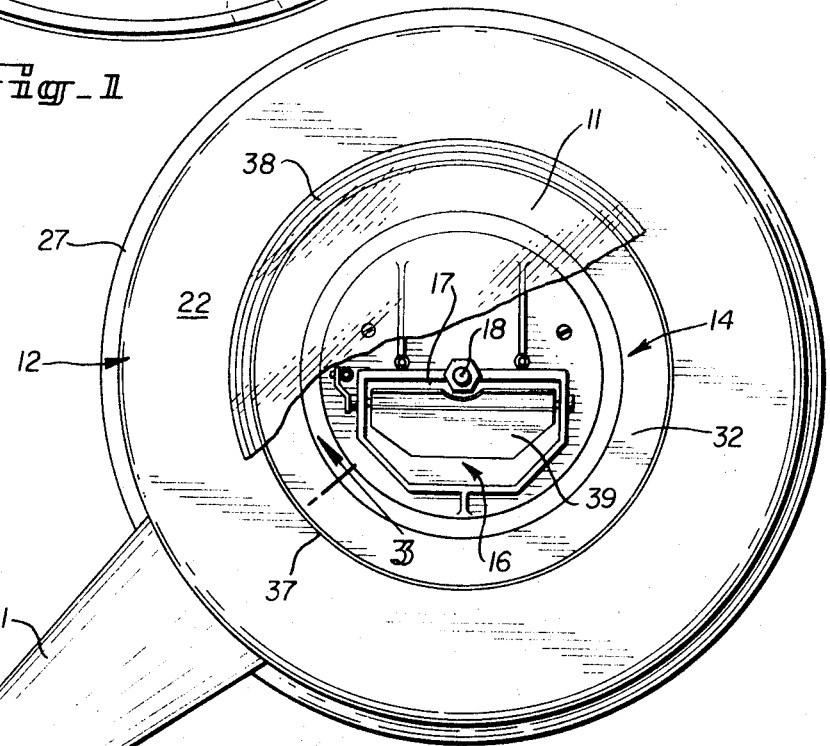
Fig_2
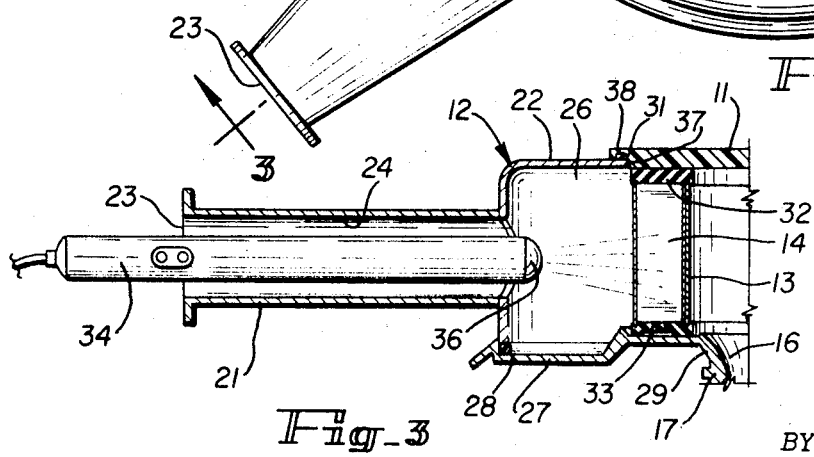
Fig_3
INVENTOR.
CHARLES EISEL
BY
ATTORNEY

ENGINE AIR FILTER UNIT

BACKGROUND OF THE INVENTION

In recent years most internal combustion engines are provided with an intake air filter. Predominantly these filters utilize a paper-type filter element disposed in multiple convoluted layers arranged in a ring or torus form. The filter elements so formed are disposed within a housing provided with an air inlet or horn. The housing is usually formed for direct mounting on the engine carburetor. In such installations all of the air used for combustion by the engine is directed through the filter element in order to reduce the wear and maintenance costs for the engine. The filter elements are usually of a replaceable type that should be changed or cleaned periodically in order to maintain efficient airflow into the carburetor and to maintain proper fuel/air ratios for the engine. Filter units that are mounted on the carburetor have to be removed in connection with various automotive maintenance operations in addition to the presently required removal for the purpose of inspecting or replacing the filter element.

Present air filter systems work efficiently and well when they are properly serviced and maintained. Several problems arise, however, in connection with use of the present systems. A filter element normally lasts a considerable length of time and usually does not require replacement at each vehicle service interval. Because of this factor the inspection of the filter element is often overlooked. A further problem arises since the nature of vehicle useage can significantly change the life interval for an in place filter element. Where dusty conditions are encountered, an element should be changed quite often. Under other circumstances the filter element might last a significantly longer period than that presently recommended by the manufacturers. Due to these factors the most efficient replacement interval can be quite variable.

A further shortcoming of present equipment results from the fact that an installed filter unit sits on the carburetor in position obstructing visual inspection of many of the important working elements of the carburetor. Where carburetion difficulties have been experienced, it is usually necessary for a mechanic to remove the filter unit to adequately diagnose and service operational problems. The present invention is intended to eliminate or minimize some of the present difficulties without hindrance to the beneficial features of current installations.

SUMMARY OF THE INVENTION

The present invention is directed to the provision of a changed filter unit housing so that at least a portion of such housing that is disposed about the carburetor or other operational and working parts will be transparent. In a preferred form of the invention a central top or cover plate is made of transparent material so that the internal surface of a filter element and the intake barrel of the carburetor will be exposed to view. Preferably the cover plate or viewing element should itself be individually removable so that direct access through the housing to the interior of the filter and to the carburetor is possible. With such arrangement the filter element may be visually inspected and carburetor troubles can be more readily diagnosed and corrected.

BRIEF DESCRIPTION OF THE DRAWINGS

FIG. 1 is a perspective view illustrating a preferred form of the invention,

FIG. 2 is a top view further showing features of the invention, and

FIG. 3 is a side elevation taken along the line 3-3 of FIG. 2 showing additional features of the invention.

DESCRIPTION OF THE PREFERRED EMBODIMENT

In a preferred form of the invention a transparent cover plate 11 is positioned on a filter unit housing 12. Where the cover plate 11 is centrally disposed on a filter unit of the type to be mounted on a carburetor, both the interior surface 13 of a filter element 14 and the intake barrel or throat 16 of a carburetor 17 may be conveniently observed. As in previous filter units of this type, a central mounting bolt 18 is used to extend upwardly from the carburetor to hold the entire filter unit 12 and its cover plate 11 in position on the carburetor.

A wingnut 19 or other type fastener may be used to hold the filter unit in position so that the air inlet horn 21 of the filter unit housing 22 will be disposed to receive incoming air that is to be used for combustion in an internal combustion engine. The horn 21 provides an inlet 23 and an inlet flow passage 24, as shown in FIG. 3, that communicates directly with an outer chamber 26 of the housing 22. The housing 22 usually rests on a baseplate 27 with a resilient seal 28 being provided between the housing 22 and baseplate 27 so that all the air received in the outer chamber 26 of the housing 22 must pass through the inlet horn 21. The baseplate 27 is usually provided with a central lip 29 that sits on top of the inlet barrel 16 for the carburetor 17.

A filter element 14 having top and bottom support rings 32 and 33 of resilient material is disposed between the baseplate 27 and the housing 22. The top and bottom rings 32 and 33 provide an effective seal so that all the air in the outer chamber 26 must pass through the filter element 14 before it can be ingested into the throat 16 of the carburetor 17. As shown in FIG. 3, the transparent cover plate 11 is mounted to engage an exterior surface 31 of the housing 22 and is also moved into contact with the top ring 32 of filter element 14 when the wingnut or fastener 19 is tightened.

When the completed unit is installed on a carburetor, the inlet throat 16 of the carburetor may be seen through the cover plate 11. Similarly, the interior surface 13 of the filter element 14 may be observed. With this arrangement the condition of the filter element can be readily determined so that replacement or servicing can be accomplished on a "when necessary" basis. Dirt or soil that is seen on the interior surface 13 of the filter element will indicate that the element should be changed or cleaned.

The flow capacity or efficiency of the filter element can be readily determined by an experienced mechanic if a light is shown through the inlet 23. For more accurate indications of filter element capacity, a light source 34 can, in fact, be introduced into the air horn 21 to bring a light or other source of illumination 36 into the interior of the housing 26 to be directed through the filter element 14. When adequate light is transmitted, no further servicing will be required. When the light is substantially blocked by the accumulations of dirt in the filter element, the wingnut 19 may be removed so that the housing 22 can be removed to expose the filter element for removal and servicing. If the filter element 14 is smaller than the opening 37 in the housing 22, the filter element can be directly removed without any requirement for removing the baseplate 27 and housing 22. For configurations of this type an O-ring or other seal 38 may be provided between the cover plate 11 and the exterior surface 31 of the housing 22.

In addition to providing for the convenient inspection of the filter element, the present invention makes it possible to readily see and observe the interior of the carburetor. The butterfly valve and its operation may be observed to see if complete opening and closing is obtained. Similarly the choke valve 38 may be observed from above so that the operator or mechanic can know whether this unit is operating properly. With the present extensive use of automatic chokes the observation of this functioning or malfunctioning device can be readily observed so that the all too often necessary adjustments or corrections can be made.

The condition and functional operation of other important carburetor components can likewise be conveniently observed through the transparent cover plate 11. The operation of the main fuel control jets and of accelerator pumps and jets can be seen. Importantly, the operation of these carburetor components can be observed under actual operational conditions.

Where it is not necessary to remove the filter unit, the flow conditions for the carburetor will not be changed at the time of observation. Experienced mechanics will realize the importance and advantage of even this improvement. No compensations will be necessary for the change in flow characteristics presently experienced due to the change in inlet flow pressures caused by installing and removing a filter unit. A final and accurate adjustment can be made initially. Further, once such adjustment for peak efficiency has been made the operator or mechanic can more easily determine when changes in flow conditions are being caused by subsequent changes in the flow capacity of the filter element itself.

The filter unit incorporating the features of this invention may be economically built and sold. Present filter bodies of metal are adequate and serviceable. A cover plate that is transparent may be formed or fabricated from glass type or plastic materials. At the present time many plastic materials, such as the ABS compounds, and fiber-reinforced plastics (FRP) are being used for automotive structural and service parts. These materials can easily be adapted for use to provide the filter unit bodies and transparent cover plates. For all embodiments of the invention, some visual observation of working parts of the engine or its components, such as the carburetor, is contemplated.

I claim:

1. An automotive-type air filter unit for use with carburetors and the like on internal combustion engine systems comprising a filter unit body mounted on the carburetor and adjacent operatively working parts of said engine system, and a transparent cover plate on said filter unit body positioned in proximity to the working parts of the engine system whereby such parts may be observed through said cover plate.

2. Structure as set forth in claim 1 and further comprising a filter element disposed in said filter unit adjacent said cover plate whereby air-transmitting surfaces of the filter may be observed.

3. Structure as set forth in claim 2 wherein said cover plate is removable and is of a size larger than said filter element with air seal surfaces of said filter engaged by said cover plate whereby said seal surfaces may be observed through said cover plate and/or the filter element may be removed from said filter unit after removal of the cover plate.

4. Structure as set forth in claim 2 wherein said filter unit body is provided with an access opening and said access opening, filter element and cover plate are cooperatively disposed whereby light from a light source introduced through said access opening will be transmitted by air-transmitting surfaces of said filter element for inspection purposes to be observed through said transparent cover plate.